(12) United States Patent
Cahill et al.

(10) Patent No.: US 8,869,024 B2
(45) Date of Patent: Oct. 21, 2014

(54) MONITORING A BACKGROUND PROCESS IN A WEB BROWSER AND PROVIDING STATUS OF SAME

(75) Inventors: Matthew Cahill, Redwood City, CA (US); Christopher W. Putnam, Emerald Hills, CA (US); Daniel Reed Weatherford, Emerald Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 999 days.

(21) Appl. No.: 12/506,223

(22) Filed: Jul. 20, 2009

(65) Prior Publication Data

US 2011/0016381 A1   Jan. 20, 2011

(51) Int. Cl.
| | | |
|---|---|---|
| G06F 17/22 | (2006.01) | |
| G06F 11/30 | (2006.01) | |
| G06F 11/34 | (2006.01) | |
| G06F 21/53 | (2013.01) | |
| H04L 12/26 | (2006.01) | |
| H04L 29/08 | (2006.01) | |
| G06F 17/27 | (2006.01) | |

(52) U.S. Cl.
CPC .......... *G06F 11/302* (2013.01); *G06F 11/3017* (2013.01); *G06F 11/3055* (2013.01); *G06F 11/3466* (2013.01); *G06F 11/3495* (2013.01); *G06F 21/53* (2013.01); *H04L 43/0817* (2013.01); *H04L 67/02* (2013.01); *G06F 2201/865* (2013.01); *G06F 2201/875* (2013.01)
USPC .......... 715/234; 715/200; 715/203; 715/240; 715/733; 715/738; 715/748; 715/749

(58) Field of Classification Search
CPC .................................................. G06F 11/3017
USPC ......... 715/200, 203, 234, 240, 733, 738, 748, 715/749
See application file for complete search history.

(56) References Cited

U.S. PATENT DOCUMENTS

| | | | |
|---|---|---|---|
| 6,052,469 A * | 4/2000 | Johnson et al. | 380/286 |
| 6,374,359 B1 | 4/2002 | Shrader et al. | |
| 6,510,439 B1 * | 1/2003 | Rangarajan et al. | 715/229 |
| 6,769,019 B2 * | 7/2004 | Ferguson | 709/219 |
| 7,243,079 B1 | 7/2007 | Manolis et al. | |
| 7,668,905 B2 * | 2/2010 | Bernardini et al. | 709/203 |
| 7,716,361 B2 * | 5/2010 | Messer | 709/231 |
| 7,809,802 B2 * | 10/2010 | Lerman et al. | 709/217 |

(Continued)

OTHER PUBLICATIONS

"SWFUpload v2 Documentation", published: Jul. 10, 2008, publisher: SWFupload.org, pp. 1-19.*

(Continued)

*Primary Examiner* — Stephen Hong
*Assistant Examiner* — Wilson Tsui
(74) *Attorney, Agent, or Firm* — Fenwick & West LLP

(57) ABSTRACT

The functionality of a browser application is enhanced using a browser plug-in, which enables the browser application to access portions of a file system not otherwise accessible to the browser application. The enhanced functionality provided by the browser plug-in is used in one example by an image uploading web application. The browser application may also start a task in the background, such as a task for uploading several images, and then monitor the progress of the task even when the browser application navigates away from the page that initiated the task. The browser application may use a local web server running on the client device to perform tasks, including the rendering of images and monitoring progress of long running tasks.

31 Claims, 9 Drawing Sheets

(56) References Cited

U.S. PATENT DOCUMENTS

| | | |
|---|---|---|
| 2002/0104096 A1* | 8/2002 | Cramer et al. ............... 725/113 |
| 2004/0008226 A1* | 1/2004 | Manolis et al. .............. 345/769 |
| 2004/0162807 A1 | 8/2004 | Montagne |
| 2005/0210413 A1* | 9/2005 | Quek et al. ................... 715/838 |
| 2006/0005124 A1 | 1/2006 | Speicher |
| 2007/0039050 A1* | 2/2007 | Aksenov et al. ............... 726/22 |
| 2007/0189708 A1 | 8/2007 | Lerman et al. |
| 2008/0294383 A1* | 11/2008 | Parmar et al. ................. 702/186 |
| 2009/0064135 A1 | 3/2009 | Jimmerson |
| 2009/0138550 A1* | 5/2009 | Pageron ....................... 709/203 |

OTHER PUBLICATIONS

Matt Berseth, "asp.net AJAX Progress Bar Control", published: May 2008, publisher: mattberseth.com, pp. 1-14.*

Dino Esposito, "Reporting Task Progress With asp.net 2.0", published: Sep. 2006, publisher: msdn.microsoft.com, pp. A, 1-12.*

Garfinkel, S. et al., "Practical UNIX and Internet Security, Second Edition," Apr. 1996, ISBN 1-56592-148-8, three pages. [Online] [Retrieved Jul. 26, 2010] Retrieved from the Internet <URL:http://docstore.mik.ua/orelly/networking/puis/ch23_08.htm.>.

PCT International Search Report and Written Opinion, PCT Application No. PCT/US2010/038855, Aug. 17, 2010, nine pages.

* cited by examiner

MONITORING A BACKGROUND PROCESS IN A WEB BROWSER AND PROVIDING STATUS OF SAME

FIELD OF THE INVENTION

This invention relates to browser plug-ins for enhancing the capabilities of a browser application used to access information resources on a network.

BACKGROUND

A browser application allows a user to retrieve and present information from resources on a network, such as the Internet or a private network, as well as from resources on a user computer. An information resource or a resource can be a file stored on a computer, for example, a document, an image file, a video file or any other media file. In a typical use case, a web server sends information to a browser application running on a client device in the form of documents written in a markup language, such as Hypertext Markup Language (HTML). A markup language document retrieved by a browser application can contain data and instructions that are executed on by the browser application. For example, a markup language document can include scripts for execution by a scripting engine supported by the browser application. An example of a scripting language supported by browser applications is JAVASCRIPT. A markup language document may also include instructions written in the markup language for rendering and drawing a user interface on the client device by the browser application.

To avoid intentional and unintentional harm caused by instructions in the markup language document, browser applications restrict the capabilities of the instructions that can be executed by a markup language document. For example, a markup language document is allowed to access only restricted portions of the file system of the client device. If the markup language document instructions were allowed unrestricted access to the file system of the client device, a malicious website could steal private information stored on client devices or even delete user files stored on client devices causing loss of data. The framework that restricts the capabilities of the browser application is referred to as a "sandbox." Moreover, the capabilities of the instructions that can be included in a markup language document are limited as compared to processes written using general purpose programming languages, for example, C or C++. The performance obtained by implementing certain functionality using the scripting capabilities available in a markup language document can also be slow compared to an implementation using a general purpose programming language.

SUMMARY

Embodiments of the invention enable a browser application to monitor status of a task running on a machine. In one embodiment, the browser application receives a first markup language document that embeds a browser plug-in and also includes instructions to execute a task. The browser application sends a request to the browser plug-in to start execution of the task. Information identifying the task is stored. The browser application downloads a second markup language document from the website that does not embed the browser plug-in. The second markup language document includes instructions to monitor the status of the task. The browser application retrieves the stored information identifying the task and sends a request for information describing the task. The information describing the status of the task is received. The second markup language is rendered for display by the browser application. The information rendered for displaying the second markup language includes information describing the status of the task.

In an embodiment, the browser application is closed responsive to sending the request to start execution of the task. A new instance of the browser application is instantiated to receive the second markup language. In an embodiment, the request for information describing status of the task is sent to a process running on the machine. In an embodiment, the process running on the machine is a web server. In an embodiment, the information identifying the task is stored as a browser cookie. When the task execution is completed, the browser cookie is cleared. The task being executed and monitored can upload files to the website, for example, media files including images files.

The features and advantages described in this summary and the following detailed description are not all-inclusive. Many additional features and advantages will be apparent to one of ordinary skill in the art in view of the drawings, specification, and claims hereof.

Figure 1:
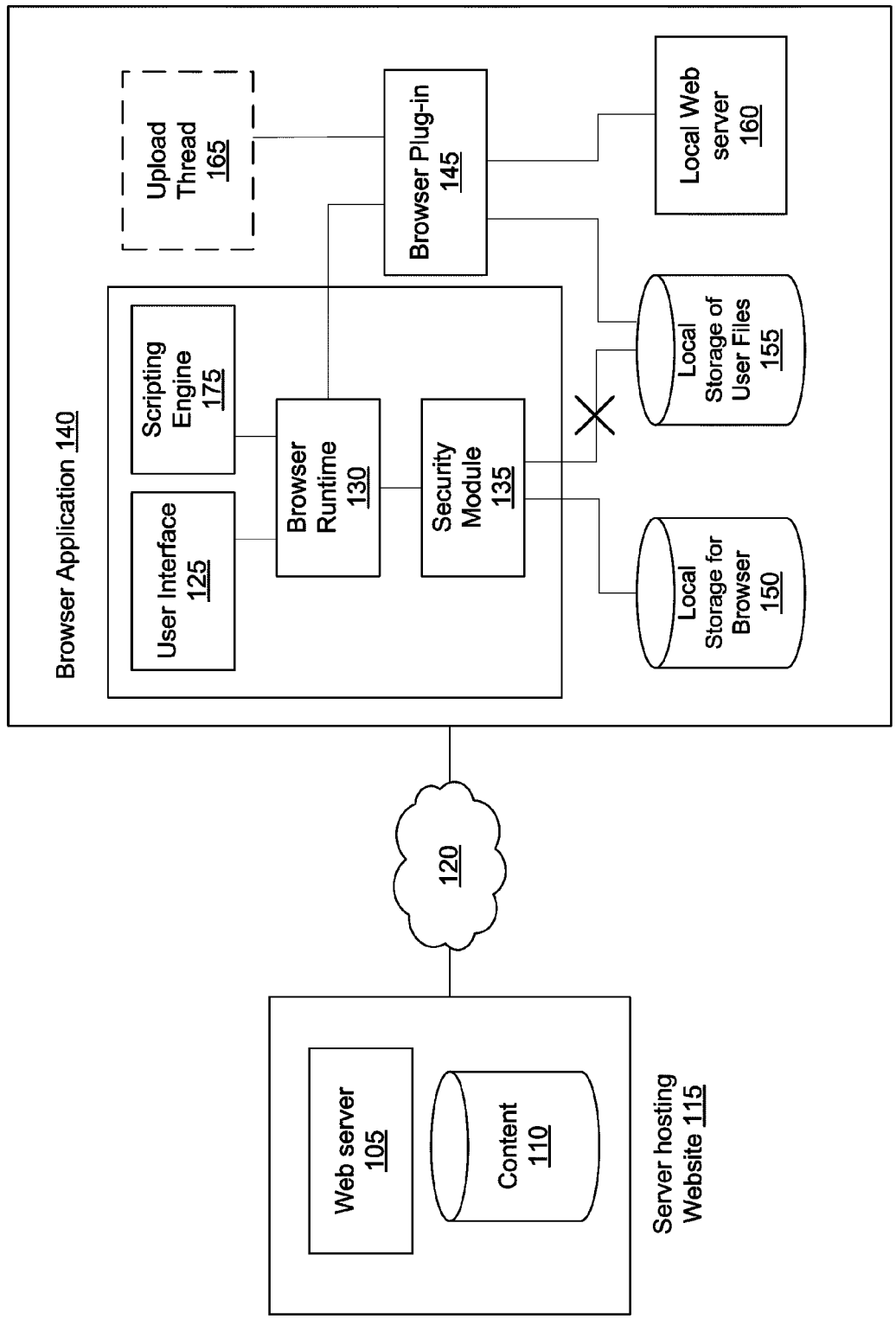
FIG. 1 is a diagram illustrating the system architecture of a client device running a browser application interacting with a website, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Browser Plug-in for Enhancing Browser Application Functionality

The quality of user experience provided by a web application can be improved if the capabilities of the instructions executed by the markup language documents used for implementing the web application are enhanced. Furthermore, an enhanced instruction set for execution by a markup language document can allow development of features of web applications that may not be possible or highly cumbersome to implement without the enhanced instructions.

For example, browsers are typically configured so that web application applications are prevented from accessing certain user files on a client device to avoid malicious websites from gaining such access. However, this restriction is a blanket restriction that denies access to all applications, including trusted applications running on authentic websites that are carefully implemented to avoid any harm to the client device. For example, a web application that uploads image files from the client device to the web server to allow the user to share images to other users needs to access the user files stored on the client device. Facilitating access by the markup language document to user files on the client device allows ease of development of the applications (e.g. an image sharing web application) by developers, and a better user experience for users, faster performance, and user interfaces customized specifically to particular websites, applications or activities.

This access, and the benefits that go along with it, can be facilitated by a browser plug-in. The browser plug-in can provide access to various local resources available on the client device that may not be typically accessible to a markup language document. The browser plug-in can also provide improved performance for tasks that are typically implemented inefficiently using the basic scripting language support available to a markup language. In an embodiment, the browser plug-in allows a web application to start a long running task, for example, uploading of images from the client device to a web server and enables a user to monitor the progress of the task periodically. The user can perform other tasks using the web application while monitoring the long running task. In an embodiment, the browser plug-in allows computationally intensive operations to be performed on the client device, thereby reducing the load on the web server. For example, image or video processing tasks can be performed on the client device. The ability to perform processing on the client can be used to reduce the amount of data transferred between the client device and the web server, thereby reducing communication overhead and improving the performance of the web application.

A browser plug-in is implemented using a general purpose programming language that provides more features compared to the instruction set typically available to a markup language document. The browser plug-in may be based on technologies, such as ActiveX or NSAPI, for extending the functionality of the browser application. The plug-in can be made available as a binary executable file. Since the browse plug-in may be written in a programming language that cannot be invoked from a markup language document, an application programming interface to the functionality provided by the browser pug-in is provided using a language that can be invoked from the markup language document, for example, a language supported by a scripting engine of a browser application. The browser plug-in must be downloaded and installed from authentic information sources to avoid downloading browser plug-in code that may have been tampered with. A headless plug-in is a plug-in that does not have a user interface for interacting with users.

The functionality of a browser application can be extended using programs written in the JAVA programming language that are called applets. However, a sandbox framework restricts the access to the client device that is available to the applet program. A signed Java applet has access to more resources of the client device compared to an unsigned jar. However, a signed jar may present the user with a dialog box outlining the requested access and providing the user with an opportunity to deny the access. However, for an application that is downloaded by the user from an authentic source, the presentation of dialog boxes requesting user's permission to access local resources may result in an undesirable user experience, in that it may be slower, as well as lacking in customization for a particular purpose, website or application (both functionally and aesthetically).

System Architecture

FIG. 1 is a diagram illustrating the system architecture of a client device 170 running a browser application 140 interacting over the network 120 with a server 115 hosting a website. The server 115 includes a web server 105 and a content database 110. The client device 170 includes a browser application 140, local storage for browser 150, local storage for user files 155, a task execution module 165, browser plug-in 145, and a local web server 160. The browser application 140 includes a user interface 125, a browser runtime 130, and a security module 135.

The client devices 170 is a computing device that can receive member input and can transmit and receive data via the network 120. For example, the client devices 170 may be desktop computers, laptop computers, smart phones, personal digital assistants (PDAs), or any other device including computing functionality and data communication capabilities. The client devices 170 are configured to communicate via network 120, which may comprise any combination of local area and/or wide area networks, using both wired and wireless communication systems. The web server 105 links the website hosted by server 115 via the network 120 to one or more client devices 170. The web server 105 serves web pages, as well as other web-related content, such as Java, Flash, XML, and so forth. The content served by the web server 105 is stored in the content database 110. In an embodiment, the communication between a web server and the browser application uses the hypertext transfer protocol (HTTP).

The browser application 140 allows a user to retrieve and present information available in resources available on the internet or a private network. The web server 105 sends documents written in a markup language, for example, HTML to the browser application 140. An information resource is identified by a uniform resource locator (URL) and may be a web page, a media file, for example, image or video or any other piece of content hosted by a server 115. The browser application 140 has a user interface 125 for presenting information to the user as well as allowing the user to provide input. The user input may comprise data provided by the user or requests from the user which is sent to the server 115. The server 115 hosting the website may respond by providing further information in the form of a markup language document. The markup language document comprises information and instructions for rendering the information provided and for taking actions on the client device 170. The browser runtime 130 processes a markup language document and renders it for display on the user interface 125 and takes actions based on instructions provided in the markup language document. Some embodiments of browser runtime 130 include a scripting engine 175 for processing instructions provided using a client-side scripting language, for example, JAVASCRIPT. The markup language document may include instruction provided using the client-side scripting language supported by the scripting engine 175.

Since the markup language document can contain instructions to be processed by the client device 170, a malicious website can provide instructions harmful to the client device. The security module 135 controls the actions of the browser runtime 130 on the client device 170. For example, the security module 135 prevents the browser runtime 130 from accessing portions of the file system on the client device 170. The browser runtime 130 is allowed to access a portion of the local storage 150 on the client device reserved for the browser. The portion of the local storage 150 may be used by the browser runtime 130 for caching data, for storing browser cookies or other information useful for processing web pages. However, the browser runtime 130 may not be allowed to access other portions of the local storage on the client device, for example, the portion of the local storage 155 that stores user files. Examples of user files stored in the local storage 155 may include text documents, images, and video files stored by the user on the client device.

The browser plug-in is a module that includes program code to enhance the capabilities of the browser application 140. The browser runtime 130 can interact with the browser plug-in 145 to use the functionality provided by the browser plug-in 145. The actions of the browser plug-in 145 are not subject to the constraints of the security module 135. Hence, actions of browser runtime 130 that may not be allowed by the security module 135 may be facilitated by the browser plug-in 145. For example, access to local storage of user files 155 may not be facilitated by the security module 135 but may be allowed by the browser plug-in 155. Since a browser plug-in has the capability of bypassing the security imposed by the security module 135, it is important for the user of the client device 170 to make sure that the browser plug-in 145 is downloaded from an authentic and trusted source. In an embodiment, the browser plug-in 145 may accept requests only if the markup language document is obtained from a predetermined domain or a set of predetermined domains. The browser plug-in verifies the authenticity of the source of the markup language documents and if the markup language document is obtained from any domain other than the predetermined domains the request is denied. This prevents unauthorized domains from sending markup language documents and utilizing the capabilities of the browser plug-in 145 for malicious purposes. The browser plug-in 145 may start an upload thread 165 for executing long running tasks requested by the browser runtime 130. The browser plug-in 145 can start a local web server 160 on the client device to utilize functionality supported by a web server. The local web server 160 is a process running on the client device. For example, the local web server 160 can be used by the browser runtime 130 to render images available on the client device 170.

Figure 2:
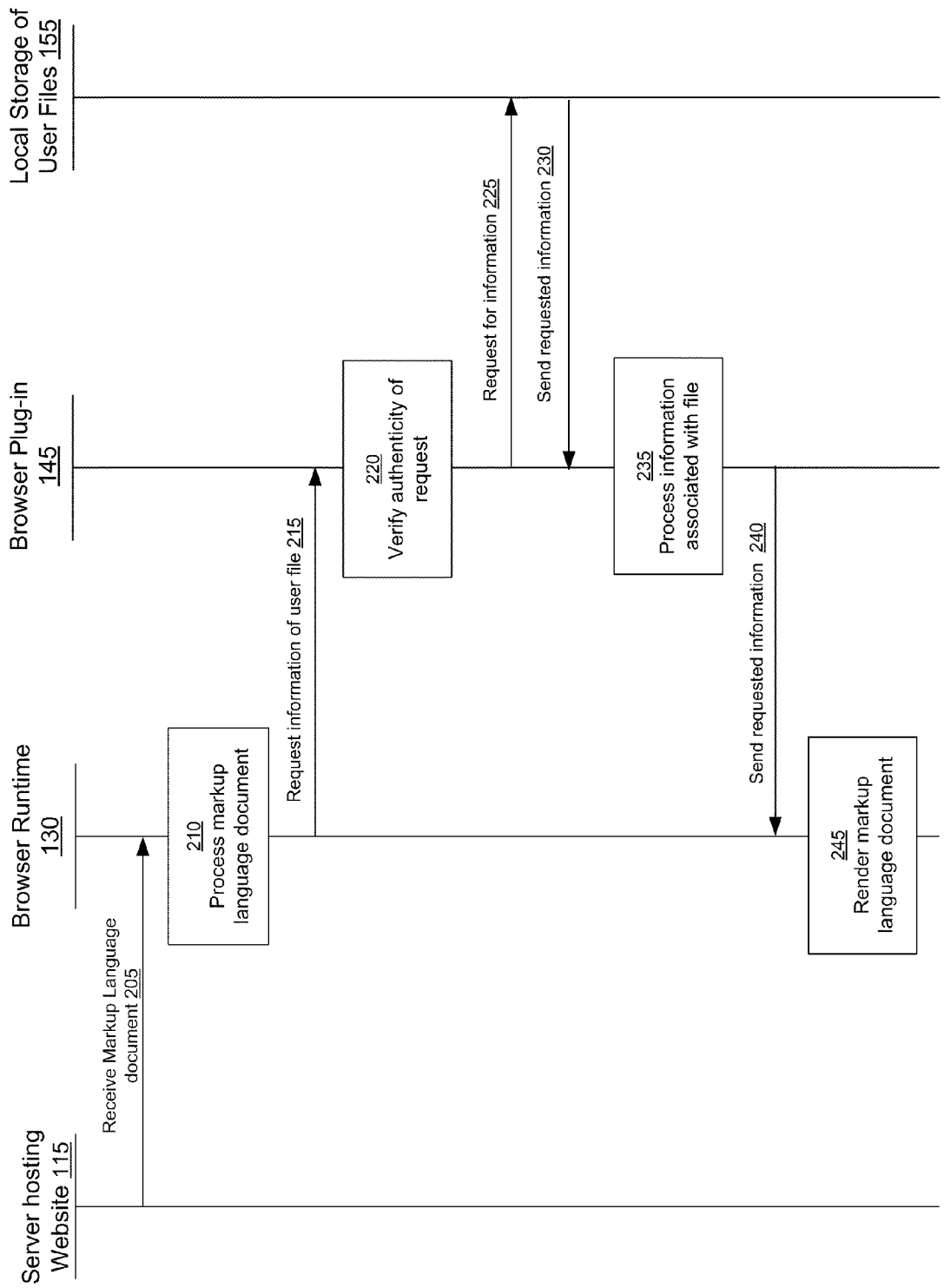
FIG. 2 is an interaction diagram of a process in which a browser application uses a browser plug-in to access information describing the local storage of user files, in accordance with one embodiment of the invention

FIG. 2 shows an interaction diagram of a process in which a browser runtime 130 interacts with the browser plug-in 145 to access information from the local storage of user files 145, in accordance with one embodiment of the invention. The browser runtime 130 of the browser application 140 receives 205 a markup language document from the server 115. The markup language document includes instructions to either load the browser plug-in 145 if it is not loaded in the client device 170 or obtain a link to the plug-in 145 if it has been previously loaded in the client device 170. In some embodiments, the markup language instruction to obtain or create a link to the browser plug-in is a markup language tag called "<embed>." The <embed> tag specifies an attribute providing the file path of the executable file with the plug-in code. For example, a markup language document may include the tag <embed src=". . ./bin/plugin.exe" . . . > to specify that the executable file for the plug-in is called "plugin.exe" and is available in the directory ". . ./bin." The browser runtime 130 processes 210 the markup language document obtained. The processing 210 of the markup language document may include parsing of the markup language document, processing of instructions provided in the markup language document, and rendering the markup language document for display using the user interface 125. The markup language document may request 215 information related to a file the browser runtime 130 is prevented form accessing by the security module 135. For example, the markup language document may request information for a user file in the local storage of user files 155.

The browser plug-in 145 verifies the authenticity of the request to make sure that an unauthorized domain is not attempting to exploit the capabilities of the browser plug-in 145. In an embodiment, the markup language document includes instruction to generate a hash value that can be used by the browser plug-in 145 to verify the authenticity of the markup language document. The hash value can be based on a combination of different pieces of information. In an embodiment, the hash value is computed based on information collected from the client device, for example, the process ID of the browser application. In an embodiment, information used for computing the hash value includes a randomly generated numeric value. If the request for information is associated with a file, the hash value computation includes the full path name of the file. Every request for information from the browser runtime 130 to the browser plug-in 145 includes the hash value. The browser plug-in independently generates the hash value based on the full path name of the file and verifies the generated value against the value provided in the request. If the hash value provided in the request to the browser plug-in 145 matches the hash value generated by the browser plug-in 145, the request is processed, or else the request is denied. An unauthorized domain sending a markup language document is unlikely to know the details of the mechanism used to generate the hash value and hence is unlikely to provide a hash value that matches the value generated by the browser plug-in 145. The hash generation mechanism can use a value called salt that is known to the web server 105 and the browser plug-in 145. The salt comprises random bits used as input to a hash generation function. Client specific data may be used for generation of the hash. For example, the process ID of the browser application 140 can be used as part of the salt used for hash generation. Some embodiments use a public key encryption mechanism based on hash values for authenticating the source of request to the browser plug-in 145.

If the authenticity of the request is successfully verified 220, the browser plug-in processes the request, for example, by sending a corresponding request for information to the local storage of user files 155. Since the browser plug-in is authorized to access the local storage of user files 155, the local storage of user files 155 sends the requested information. In some embodiments the request 225 and response 230 may be a function call implemented using a programming language, for example, C or C++ used for implementing the browser plug-in 145. The browser plug-in may perform processing 235 using the information related to the file. In an embodiment, the information associated with the file is metadata associated with the file, for example, the file type, file extension, an executable program associate with the file, or a user preference associated with the file. The browser plug-in may generate a thumbnail for an image file. The thumbnail may be generated or computed based on metadata associated with the file. For example, a file with a particular extension may be displayed using a particular thumbnail associated with the file extension. Alternatively, a file associated with a particular executable program may be displayed using a thumbnail associated with the corresponding executable program. In one embodiment, large files, for example video files that need to be uploaded to the web server 105 can be encoding by the browser plug-in 145 on the user device so as to reduce the upload time and also to reduce the server load caused by the encoding of files.

The browser plug-in 235 sends the requested information to the browser run-time 130. The information received is used by the browser runtime 130 to render the markup language document for display using the user interface 125. In some embodiments the browser plug-in may provide functionality that allows access to local resources available on the client device. For example, the location of the client device 170 can be obtained using the wireless capabilities available in the client device 170. In some embodiments, computationally intensive tasks can be performed by the browser plug-in, thereby offloading work from on the web server 105 to the client device 170. A video encoding task can be performed in the background while the user can perform other tasks on the web application. The user is not required to wait for the long running task to complete before navigating away from the web page executing the task.

In an embodiment, the browser plug-in 145 is used for caching frequently used information on the client device 170 to avoid the communication overhead of repeatedly sending the information from the server 115. In another embodiment, the browser plug-in 145 is used to download program code or other information from the website hosted by server 115. Since the browser plug-in 170 has authentication mechanisms for verifying the source of a request, the user can have confidence that the program code or information is downloaded from an authentic source. The ability to download program code from authentic sources by the browser plug-in 170 provides better user experience in installing software from the website hosted by server 115.

Photo Uploader Example Implementation

Figure 3:
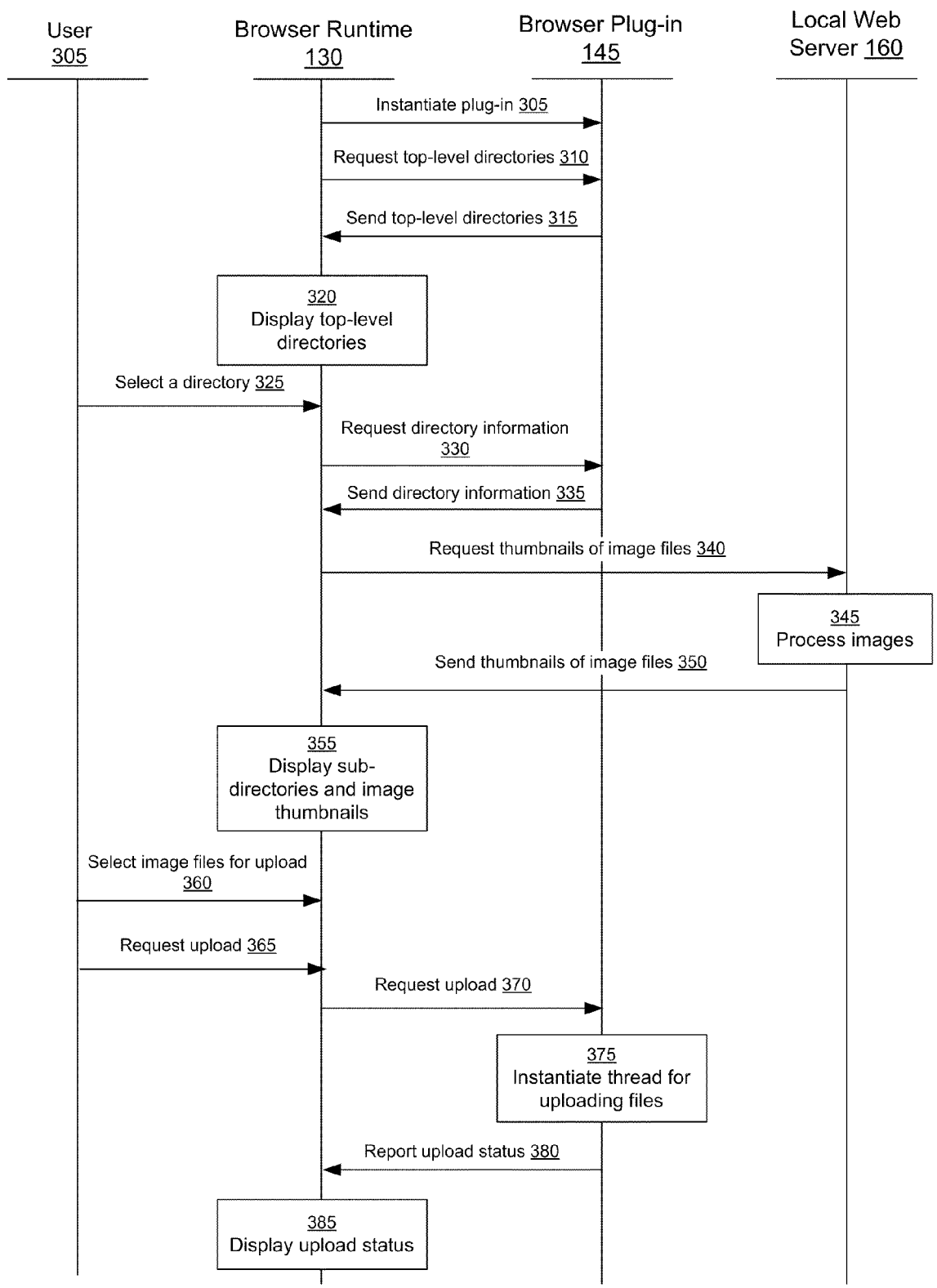
FIG. 3 is an interaction diagram of a process in which a user interacts with a browser application to upload images stored in the client device to a web server, in accordance with one embodiment of the invention.
Figure 4:
FIG. 4 is an example display of the browser application showing a web page that allows a user to view the directory structure of user files, in accordance with one embodiment of the invention.

The capabilities of the browser plug-in 145 can be used by applications in various ways. FIG. 3 shows an interaction diagram of a process in which the user 305 interacts with the browser application 140 to upload images stored in the local storage 155 to the server 115. When the image upload application is started by receiving the appropriate web pages from the server 115, the browser plug-in is instantiated 305. The markup language document from server 115 that starts the image upload application includes instructions to cause the browser runtime 130 to request 310 information related to the top-level directories of the local storage. The browser plug-in sends 315 the information describing the top-level directories to the browser runtime 130. The top-level directories may be predetermined, for example, root directories of the disk drives of the client device, or operating system specific directories intended for storage of user files. Browser runtime 130 renders the top-level directories and displays 320 them in the user interface 125. FIG. 4 shows a screenshot of the user interface of the image upload application showing the top-level directories. The panel 410 of the user interface shows the top-level directories, including the Desktop directory, the Home directory, and the Pictures directory.

Figure 5:
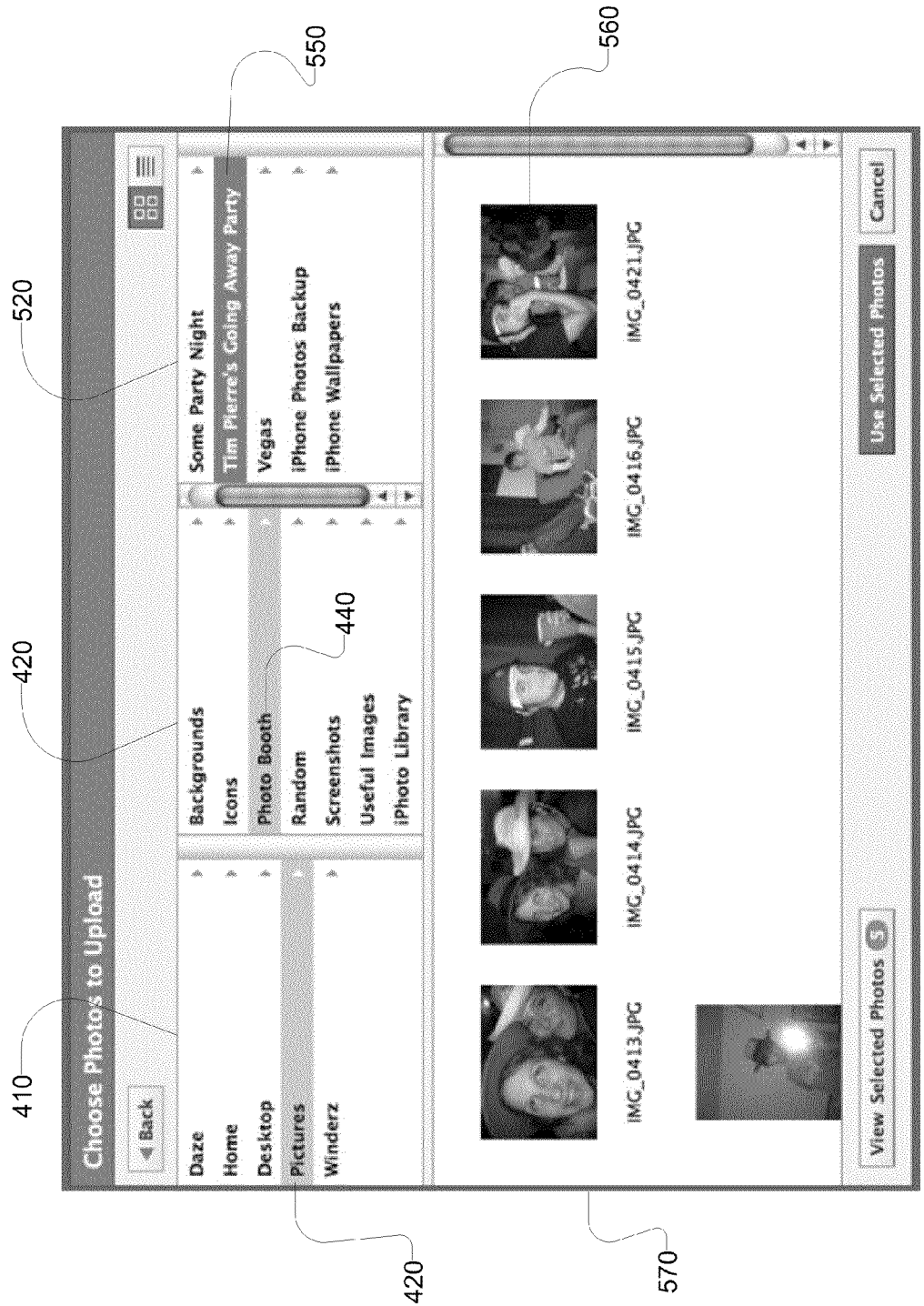
FIG. 5 is an example display of the browser application showing a web page that allows a user to view thumbnails of images stored as user files, in accordance with one embodiment of the invention.

The user 305 can select a particular directory displayed to see contents of the directory. For example, in FIG. 4, the Pictures directory 430 is selected by the user. The browser runtime 130, in response to the user selection, requests 330 the directory information for the selected directory from the browser plug-in 145. The browser plug-in 145 obtains the requested directory information and sends 335 the requested information to the browser runtime 130. The browser runtime 130 displays the information in the user interface 125. The panel 420 in FIG. 4 shows the sub-directories of the selected directory 430 including sub-directories 440. The process of selecting directories to view the corresponding sub-directories can be repeated by the user. For example, the FIG. 5 shows the user selection of the directory 440 called "Photo Booth" in the panel 420 to see its sub-directories in the panel 520.

The requested information of a directory, for example, directory 550 sent 335 by the browser plug-in 145 may include image files. The image files in a web application are preferably displayed using thumbnails. For each image file within a directory, the browser plug-in sends a URL that can be used to access further information about the image file. The URL of an image file allows the browser run-time to access the image file information using the local web server 160. For example, the browser runtime 130 can provide the URL of an image file to the local web server 160 to request 340 a thumbnail corresponding to the image file. The local web server 160 processes 345 the contents of the image file to generate a thumbnail image and sends 350 the thumbnail image to the browser runtime 130. The browser runtime 130 renders the image thumbnails received from the local web server 160 and displays 355 the thumbnails along with the sub-directory information in the user interface 125. FIG. 5 shows the panel 570 displayed to the user interface as showing the thumbnails 560 of the images corresponding to the image files stored in the selected directory 550. The access to the local web server 160 requires the browser application to process scripts downloaded from one domain implemented by web server 105 and manipulate properties of the document using data from another domain implemented by the local web server 160. The browser application 140 may implement a same-origin policy that prevents scripts loaded from one domain from processing properties of a document from another domain. An embodiment overcomes this restriction of a browser by using a data interchange format that allows execution of a dynamic script provided as a string. For example JavaScript Object Notation with Padding (JSONP) allows a <SCRIPT> tag that can include script code from external domains. The URL for the local web server can be embedded within the <SCRIPT> tag to retrieve information from the corresponding website. A URL can be referred to by the code running within the <SCRIPT> tag. This allows the browser plug-in 145 to work around the same origin policy of the browser application 140.

Figure 6:
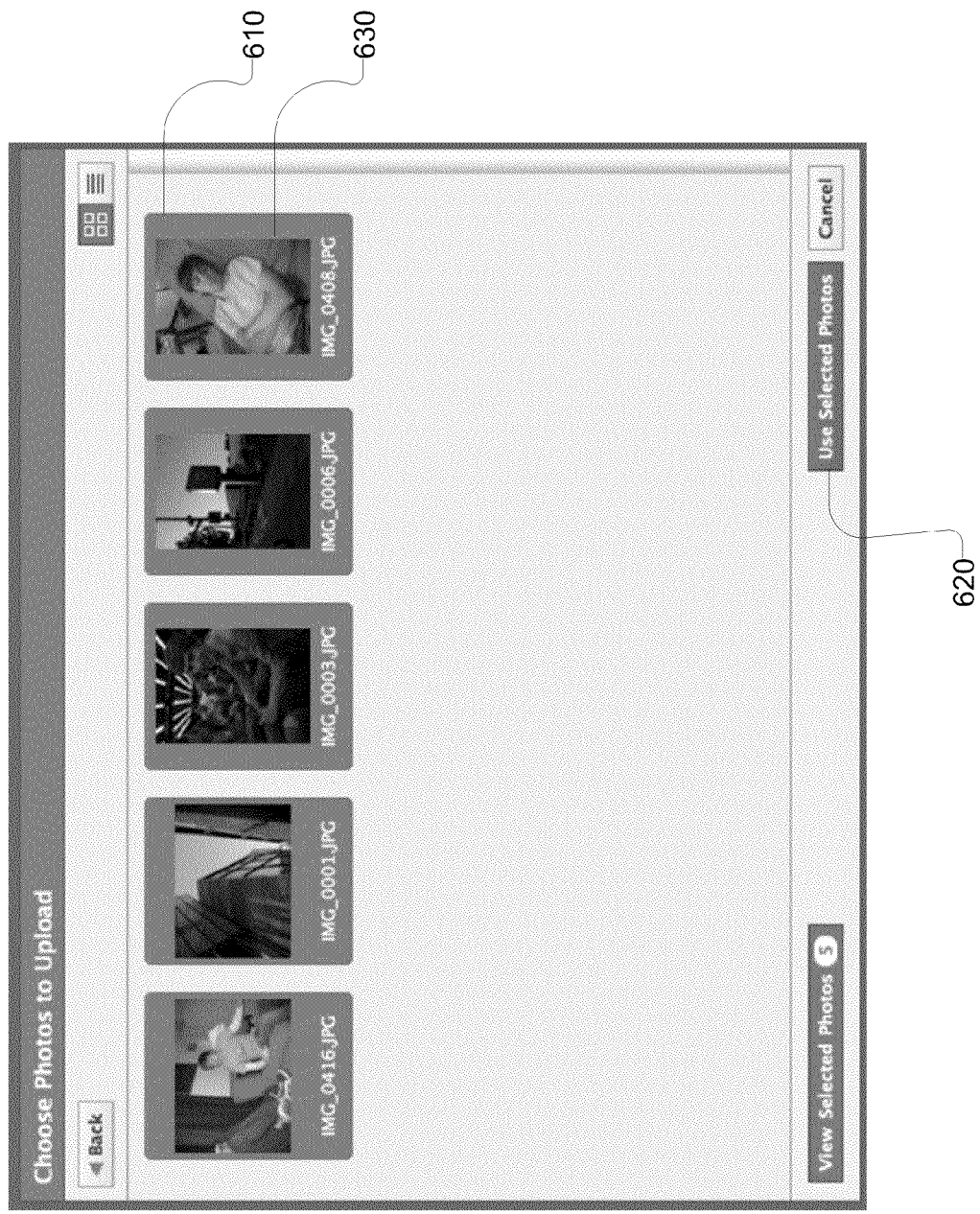
FIG. 6 is an example display of the browser application showing a web page that allows a user to select thumbnails of images for upload to the web server, in accordance with one embodiment of the invention.
Figure 7:
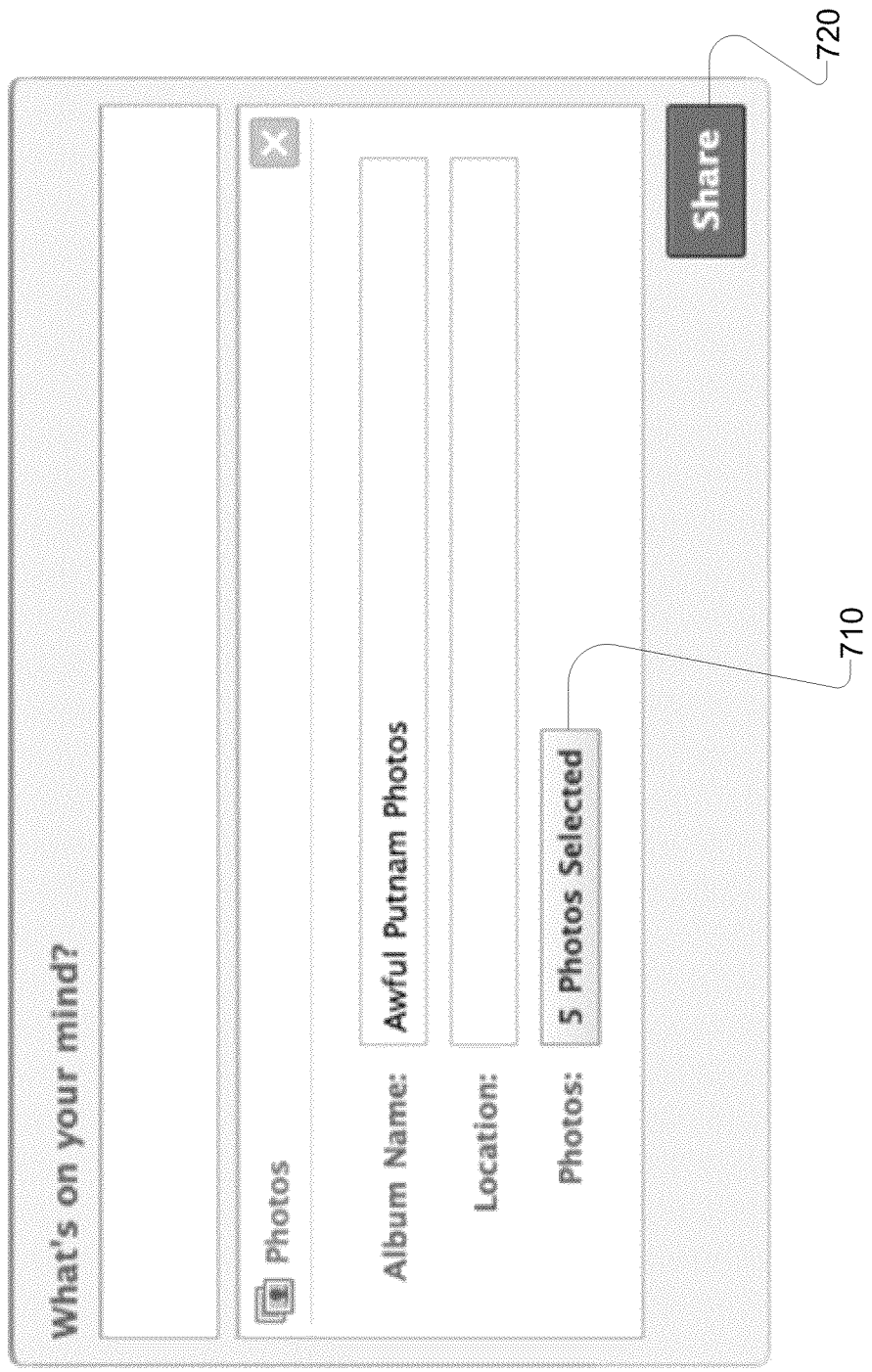
FIG. 7 is an example display of the browser application showing a web page that allows a user to start the process to upload selected image files from the client device to the web server, in accordance with one embodiment of the invention.

The user 305 can select 360 one or more image files using the thumbnails 560 for uploading the image files to the server 115. The FIG. 6 shows a screenshot of the image files 630 selected by the user 350. The thumbnails of the image files selected by the user may be distinguished from the unselected images by displaying a border 610 around the thumbnail of the selected image. A user interface button 620 allows the user to indicate that the user has completed the interactions with user interface for browsing the directories and selecting the images for upload. Accordingly, in one embodiment, the user 305 is presented with a user interface shown in FIG. 7 that indicates the number of files 710 selected by the user for uploading. FIG. 7 also shows a user interface button 720 that can be used to send a request 365 to the browser runtime 130 to start uploading the files.

Figure 8:
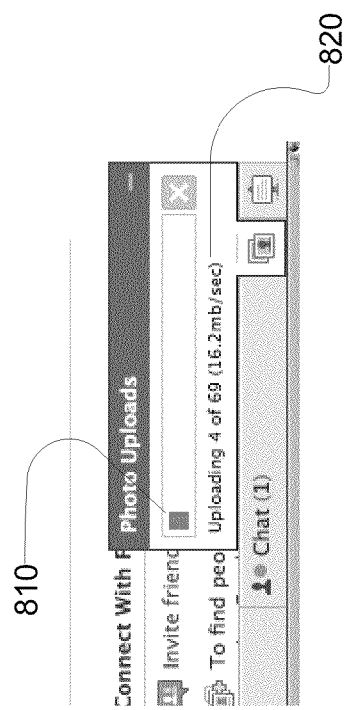
FIG. 8 is an example display of the browser application showing a web page displaying the status of a process that uploads image files to the web server, in accordance with one embodiment of the invention.

The browser runtime 130 requests the browser plug-in 365 to start the upload process for the selected images. The browser plug-in 365 starts the upload thread 165 that executes the process of uploading the selected image files to the server 115. The browser plug-in 365 can obtain the status of the upload process from the upload thread 165 and present the status to the browser runtime 160. The browser runtime 130 displays 380 the upload status to the user in the user interface 125. FIG. 8 shows a screenshot of an embodiment showing the status of the upload process using a progress indicator 810. The number of files uploaded 620 at any given time can be displayed. In other embodiments, information related to the upload process status including the amount of data that has been uploaded or the amount of data that remains to be uploaded is shown. In an embodiment, the information describing status of the task is shown as a percentage of the total amount of data that needs to be uploaded. In another embodiment, the information describing status of the task is the number of files remaining to be uploaded. In another embodiment, the information describing status of the task includes an estimate of time elapsed since the upload task started. In another embodiment, the information describing status of the task includes an estimate of time remaining for completing the upload task.

The upload of images to the server 115 from the client device 170 can take significant amount of time and the user may continue to perform other activities while monitoring the progress of the upload task. The user may navigate away from the web page used for starting the upload task. As a result a new markup language document is retrieved from the web server 105 and displayed by the browser application 140. A markup language document includes specific instructions that create and maintain a link with the browser plug-in allowing the browser runtime 130 to interact with the browser plug-in 145 while processing the markup language document. The instruction that creates and maintains a link with the browser plug-in 145 is called an instruction to embed the browser plug-in. Not all documents provided by a domain may include instructions to embed the browser plug-in 145 since execution of these instructions may slow the processing of the markup language documents. When the user navigates away from the web page of the image uploading application, a new markup language document can be received that does not include instructions to create and maintain a link to the browser plug-in 145. The browser runtime 130 can store information in the local storage for browser 150 that allows a markup language document without an embed instruction for the browser plug-in 145 to communicate with the upload thread 165 for retrieving the status of the image upload task.

Communicating the Status of a Background Process

Figure 9:
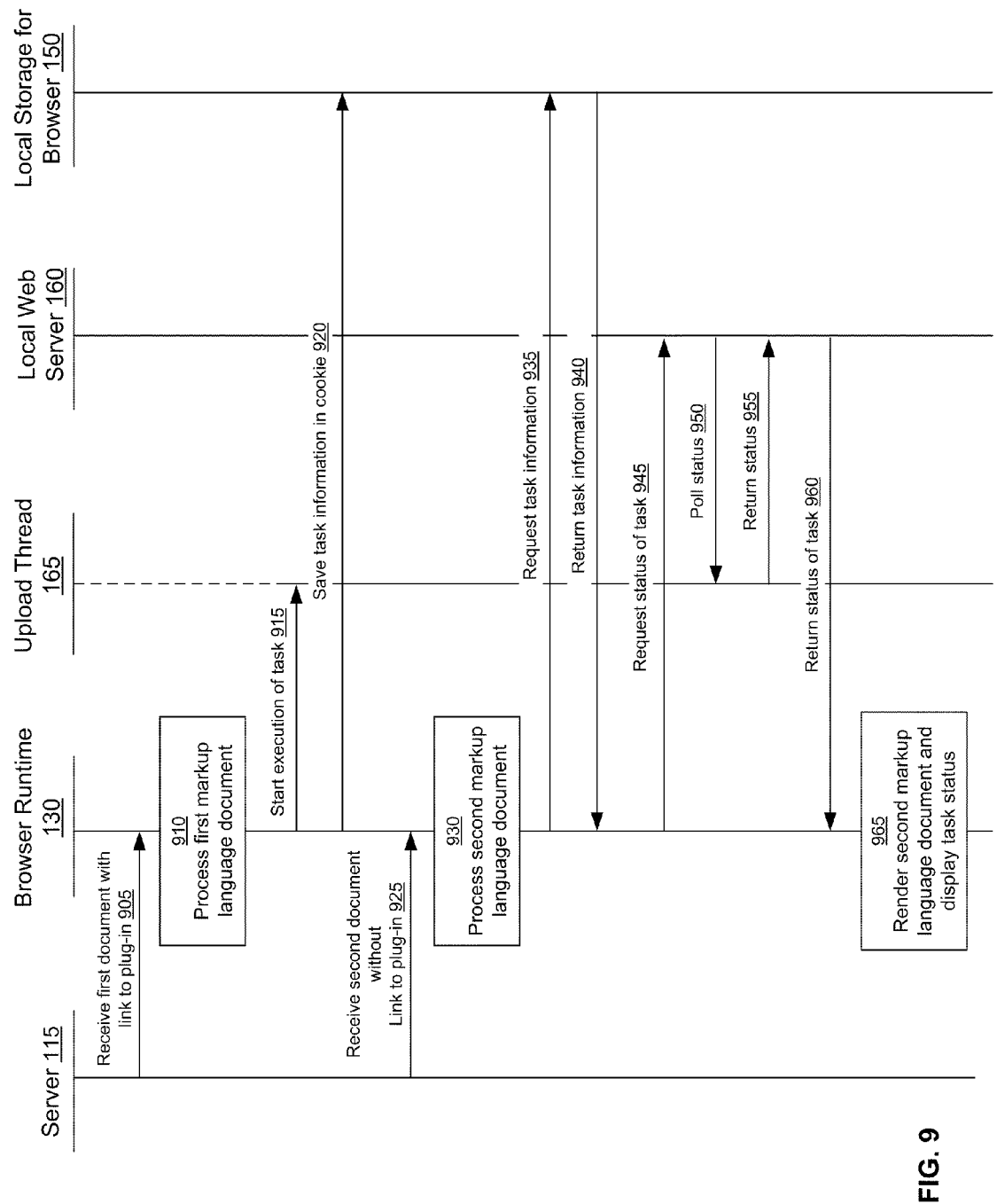
FIG. 9 is an interaction diagram of a process in which a browser application displays the status of a process after navigating to a web page that does not embed the plug-in, in accordance with one embodiment of the invention.

FIG. 9 illustrates how a markup language document can obtain the status of the upload process and display it without embedding the browser plug-in 145. Although described in terms of the photo uploading example, it can be appreciated that this process can be used to obtain the status of any process running on the client device or otherwise in communication with the client device. For example, a markup language document may start a thread that begins downloading and installing files on the client device. Embodiments of the invention may be used to obtain the status of this process and display the status in the browser application, even when the browser application is processing a markup language document that does not have the background process embedded or otherwise linked to the markup language document.

As illustrated in the example of FIG. 9, a first document received 905 by the browser runtime 130 from the server 115 includes the instructions for maintaining a link to the browser plug-in 145. The browser runtime 130 processes 910 the first markup language document and starts 915 the execution of the image upload task. The first markup language document includes instructions to communicate with the local storage for the browser 150 and save information associated with the task.

In an embodiment, a browser cookie mechanism is used to store information associated with the task stored on the local storage for the browser 150. The browser cookie stores one or more name value pairs representing information as text strings. In an embodiment, the browser cookie stores a URL for a webpage that can be accessed using the local web server 160 and the start time of the upload task. The browser runtime 130 can use the URL for the webpage available on the local web server 160 to obtain the status of the upload task.

In some embodiments, the URL for the webpage on the local server includes a hash value for authentication purposes. The local web server 160 generates a hash value independently to match against the hash value of the URL to verify the authenticity of the source of the markup language document accessing the local web server 160. As a result, markup language documents from unauthorized sources are unable to access the local web server 160. This prevents unauthorized websites from exploiting the local web server 160 for malicious purposes.

In an embodiment, the browser plug-in 145 is required to generate the hash value used for verifying authenticity of the source of the markup language. The browser plug-in 145 can be embedded in every web page loaded by the browser application 140 from the server 115 that needs to display the progress of the upload task. However, embedding the browser plug-in 145 in a web page slows the loading of the web page. Hence, the browser plug-in 145 is not embedded in every web page form server 115 in order to improve the performance of the web page loads. Instead of using the browser plug-in 145, the URL including the hash value can directly be accessed from the local web server 160 to obtain the progress information. Hence the URL is stored on the client device 170 using the browser cookie mechanism. Subsequent web pages loaded by the browser application 140 that do not embed the browser plug-in 145 include instructions to retrieve the URL using the corresponding browser cookie stored on the client device 170 and use the URL to fetch the progress information.

When the user navigates away from the first markup language document, the browser runtime 130 receives 925 and processes 930 the second markup language document, which does not embed the browser plug-in 145. The second markup language document includes instructions to process the saved task information if available, for example, the browser cookie stored 920 by the first markup language document. The browser runtime 130 sends a request 935 to the local storage for browser 150 to retrieve the saved task information and the local storage 150 returns the saved task information. The saved task information allows the browser runtime 130 to request 945 task information from the local web server 160. In response to the request 945, the local web server polls 950 status of the upload thread 165. The upload thread 165 returns the status of the upload task to the local web server 160 and the local web sever 160 returns the status of the task to the browser runtime 130. If the task is still executing, the browser runtime 130 renders 965 the second markup language and displays the status of the task, for example, as shown in FIG. 8.

If the upload task is complete, appropriate information is displayed on the user interface 125, and the saved information associated with the upload task may be cleared from the local storage 150. If the saved information associated with the upload task is cleared, any subsequent markup language document loaded from server 115 would not attempt to contact the local web server 160, unless and until a new upload task is started. In an embodiment, the task information is saved as a browser cookie, and the browser cookie is cleared when the upload task is completed.

FIG. 9 shows the same instance of browser application 140 receiving the first and the second markup language document. The instance of browser application that receives the first markup language document can be different from the instance of the browser application that downloads the second markup language. For example, the instance of browser application 140 that receives the first markup language document can be closed and the browser application 140 restarted to instantiate a second instance that receives the second markup language. The processing of the steps of the process after receiving the second markup language document can be performed by the second instance of the browser application 140 to display the status of the upload task.

FIG. 9 assumes that the first and the second markup language documents are received from the same website hosted by server 115 since both markup language documents include instructions to process the saved task information. Markup language documents obtained from two separate websites provided by two independent vendors are unlikely to have instructions to process the saved task information since the development effort for the two markup language documents must be coordinated. Hence, as illustrated in FIG. 9, the user navigates away from the first markup language document but stays on a web page obtained from the same domain. In an embodiment, the first and second markup language documents can be obtained from separate domains provided the two include instructions to process the saved task information and are authorized to access the local web server 160. Alternative embodiments provide a toolbar provided by the domain that provides the first markup language document. The toolbar stays on the browser application 140 independent of the domain that the user is navigating. The toolbar can continue to provide status of the upload task allowing the user to navigate to any web page provided by any domain.

The tasks that can be monitored by the process illustrated in FIG. 9 are not limited to upload of images but can be other tasks. For example, the status of a long running computation provided by the browser plug-in can be monitored by the process illustrated in FIG. 9. Other embodiments can monitor upload of other large files, for example, media files including videos, audio files or large documents. In other embodiments, the long running task can be a system maintenance task performed on the client device 170.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, by a browser application executing on a client device, a first markup language document from a website, wherein the first markup language document includes instructions to embed an instance of a browser plug-in and instructions to execute a task, wherein the browser plug-in is configured to manage the task on the client device;
sending a request to the instance of the browser plug-in to start execution of the task;
storing information identifying the task in a local storage of the client device;
receiving a second markup language document, wherein the second markup language document does not include instructions to embed a new instance of the browser plug-in, and wherein the second markup language document includes instructions to monitor a status of the task executing on the client device, the processing of the instructions of the second markup language comprising:
retrieving, from the local storage of the client device, the stored information identifying the task;

sending, from the browser to a process executing on the client device, a request for information describing the status of the identified task;

receiving, by the browser from the process executing on the client device, information describing the status of the identified task; and rendering the second markup language document for display by the browser application, wherein the information rendered includes the information describing status of the identified task.

2. The computer implemented method of claim 1, wherein the process executing on the client device is a web server.

3. The computer implemented method of claim 2, wherein the information identifying the task is stored as a browser cookie.

4. The computer implemented method of claim 3, further comprising:

clearing the browser cookie if the status of the identified task indicates the task is complete.

5. The computer implemented method of claim 2, wherein the information identifying the task is stored as a browser cookie that identifies a URL for a web page accessible from the web server on the client device.

6. The computer implemented method of claim 5, wherein the URL for the web page accessible from the web server on the client device includes a hash value for verification of the authenticity of a source of the second markup language document.

7. The computer implemented method of claim 6, wherein the computation of the hash value requires a salt based on a process ID of the browser application.

8. The computer implemented method of claim 1, further comprising:

responsive to sending the request to the instance of the browser plug-in to start execution of the task, closing the browser application; and starting a new instance of the browser application; and sending a request to the website using the new instance of the browser application, wherein receiving a second markup language document is responsive to sending a request to the website using the new instance of the browser application.

9. The computer implemented method of claim 1, wherein the task is uploading one or more files.

10. The computer implemented method of claim 9, wherein information describing the status of the identified task includes number of files uploaded.

11. The computer implemented method of claim 9, wherein information describing the status of the identified task includes a percentage of a total amount of data to be uploaded.

12. The computer implemented method of claim 9, wherein information describing the status of the identified task includes the number of files remaining to be uploaded.

13. The computer implemented method of claim 9, wherein information describing the status of the identified task includes an estimate of time elapsed since the upload task started.

14. The computer implemented method of claim 9, wherein information describing the status of the identified task includes an estimate of time remaining for completing the upload task.

15. The computer implemented method of claim 1, wherein the task is uploading one or more media files to the website.

16. The computer implemented method of claim 1, wherein the task is uploading one or more images to the website.

17. The computer implemented method of claim 1, wherein the task is uploading one or more video files to the website.

18. The computer implemented method of claim 1, wherein the request for information describing the task includes information identifying the task.

19. A computer program product comprising a computer-readable non-transitory storage medium containing a first markup language document received from a website, the first markup language document comprising:

instructions for a browser application to render content items encoded in a markup language comprising; and instructions for monitoring a task executing on a client device, wherein an execution of the task is started by an instance of a browser plug-in configured to manage the task in response to a request from the browser application executing on the client device interpreting a second markup language document, wherein the second markup language document does not include instructions to embed a new instance of the browser plug-in, the instructions for monitoring being interpreted by the browser application executing on the client device to cause the client device to:

retrieve, from the local storage of the client device, information identifying the task, wherein the information identifying the task is stored in the local storage of the client device by the browser plug-in in response to a request sent by the browser application processing the second markup language document;

send, from the browser to a process executing on the client device, a request for information describing status of the identified task executing on the client device;

receive, by the browser from the process executing on the client device, information describing the status of the identified task executing on the client device; and render the first markup language document for display by the browser application, wherein the information rendered includes the information describing status of the identified task.

20. The computer program product of claim 19, wherein the process executing on the client device is a web server.

21. The computer program product of claim 20, wherein the information identifying the task is stored as a browser cookie.

22. The computer program product of claim 20, wherein the information identifying the task is stored as a browser cookie that identifies a URL for a web page accessible from the web server on the client device.

23. The computer program product of claim 22, wherein the URL for the web page accessible from the web server on the client device includes a hash value for verification of the authenticity of a source of the second markup language document.

24. The computer program product of claim 19, wherein the task is uploading one or more files.

25. The computer program product of claim 24, wherein information describing the status of the identified task includes number of files uploaded.

26. The computer program product of claim 24, wherein information describing the status of the identified task includes number of files remaining to be uploaded.

27. The computer program product of claim 24, wherein information describing the status of the identified task includes a percentage of a total amount of data to be uploaded.

28. The computer program product of claim 19, wherein the request for information describing the task includes information identifying the task.

29. The computer program product of claim 19, wherein information describing the status of the identified task includes an estimate of time elapsed since the upload task started.

30. The computer program product of claim 19, wherein information describing the status of the identified task includes an estimate of time remaining for completing the upload task.

31. The computer program product of claim 19, wherein the task is uploading one or more media files to the website.

* * * * *